Sept. 21, 1943.  C. C. GILLICAN  2,329,712
METHOD OF AND APPARATUS FOR PURIFYING OLEORESIN
Filed April 4, 1939  3 Sheets-Sheet 1

Sept. 21, 1943. C. C. GILLICAN 2,329,712
METHOD OF AND APPARATUS FOR PURIFYING OLEORESIN
Filed April 4, 1939 3 Sheets-Sheet 3

Inventor,
Charles Crum Gillican,
By Ivan P. Tashof,
Attorney

Patented Sept. 21, 1943

2,329,712

UNITED STATES PATENT OFFICE 2,329,712

METHOD OF AND APPARATUS FOR PURIFYING OLEORESIN

Charles Crum Gillican, Homerville, Ga., assignor to Filtered Rosin Products, Inc., Brunswick, Ga., a corporation of Delaware Application April 4, 1939, Serial No. 266,030

18 Claims. (Cl. 260—108)

This invention relates to the production of purified rosin and has special reference to an apparatus and method for purifying oleoresin to remove the rosin and turpentine content.

The crude material derived from the trees is, in summer time, a substantially liquid substance principally consisting of a mixture of turpentine and resin, known as oleoresin, but also containing water and a considerable quantity of trash, such as chips, bark, pine needles and other impurities. This crude oleoresin is gathered mainly by scarifying pine trees and collecting the material oozing from the trees in open cups which thus exposes the collected material to contamination by falling and wind blown impurities. In winter the crude oleoresin becomes very viscous and even solidifies. This solidified material is removed from the scarred surface by scraping and is generally known as "scrape." In this winter-produced material contamination is not only affected by the adhesion of trash to the viscous oleoresin but the act of scraping the material from the trees also scrapes off chips of wood and bark and thus adds further impurities to the gathered crude material.

It is common in the art to heat this crude material, either with or without the addition of turpentine. This not only drives off much of the volatile content of the crude oleoresin but melts the latter so that it may be strained and the chips and other debris separated from the resin. The melting of the resin must be done at comparatively low temperatures and consequently the melted resin, while liquid, is still quite viscous so that considerable loss is experienced by the adhesion of the molten resin to the debris.

One important object of the present invention is to provide an improved apparatus wherein the crude oleoresin may be melted and the valuable component thereof completely separated from the chips and debris.

A second important object of the invention is to provide an improved apparatus of this character, wherein the heating of the charge of crude material will be effected in such a manner that the oleoresin will be uniformly liquefied throughout the entire mass.

A third important object of the invention is to provide, in such an apparatus, a novel arrangement of steam heating elements wherein heating and melting may be effected without or with the use of live steam as agitating means for the charge.

A fourth important object of the invention is to provide an apparatus of this character with novel means for separating the chips and other solid debris from the liquefied material, together with means adapted to assist in recovering the oleoresin adhering to and absorbed by the chips and debris.

A fifth important object of the invention is to provide such an apparatus with novel means for subjecting separated chips and debris to the direct action of steam jets whereby the chips and debris are not only heated but are also agitated and adherent oleoresin is mechanically separated from said chips and debris.

A sixth important object of the invention is to provide an apparatus for this purpose with novel means affording access to the interior for removal of the exhausted chips and debris.

Another important object of the present invention is to provide a method of treating a mass of crude oleoresin containing a minor proportion of chips and other solid debris preliminary to the final distillation of the recovered oleoresin, said process broadly comprising heating the crude mass in the presence of a solvent of the oleoresin-content of the mass, while subjecting the mass and solvent to agitation to disperse and circulate the solvent and bring the latter in contact with the oleoresin-content of the crude mass and thereafter recovering the liquefied oleoresin. As hereinafter pointed out the crude mass of oleoresin may carry its own solvent, such as turpentine or at least partly carry this solvent or, in the preferred form of the invention, the solvent may be separately introduced into the melter to augment the solvent or turpentine naturally carried by the crude oleoresin. The novel method herein disclosed includes, in the preferred form of the invention, the step of maintaining the oleoresin solution at a temperature adapted to keep the oleoresin in solution, whereby the liquefied oleoresin upon recovery may be easily conveyed to an apparatus adapted subsequently to treat the oleoresin to recover rosin therefrom. In other words, the crude mass is maintained at a temperature which will inhibit all of the turpentine from being volatilized. In one form of the invention the agent for affecting agitation and dispersion of the solvent is adapted also to heat the solvent, this agent in the preferred form being steam. However, it is within the province of the present invention to use as the dispersing agent any gaseous constituent which will inhibit oxidation, as for example, nitrogen or any of the inert gases known in the prior art. In the preferred form of the invention, the liquefied oleoresin is subjected to upwardly directed steam jets during the heating step, the step of treating the chips and solid debris with a solvent to recover the oleoresin adhering to and impregnating the chips, and during the step when the chips are steamed to affect recovery of the solvent therefrom. During each of these steps, or only in some of the steps, the material being treated may be subjected not only to the action of upwardly directed steam jets, but also to downwardly directed steam jets and preferably downwardly, inwardly and outwardly directed steam jets. This may occur irrespective whether the material being treated is liquefied oleoresin or a mass of chips being subjected to a solvent treatment or treatment for the recovery of solvent therefrom.

With the above and other objects in view, the invention consists in general of an apparatus including novel arrangements of parts and combinations of elements and of a method including a novel arrangement of steps, all as hereinafter fully described, the apparatus being illustrated in the accompanying drawings and the invention being particularly pointed out in the appended claims.

In the accompanying drawings like characters of reference indicate like parts in the several views, and.

Figures 1, 4, 5:
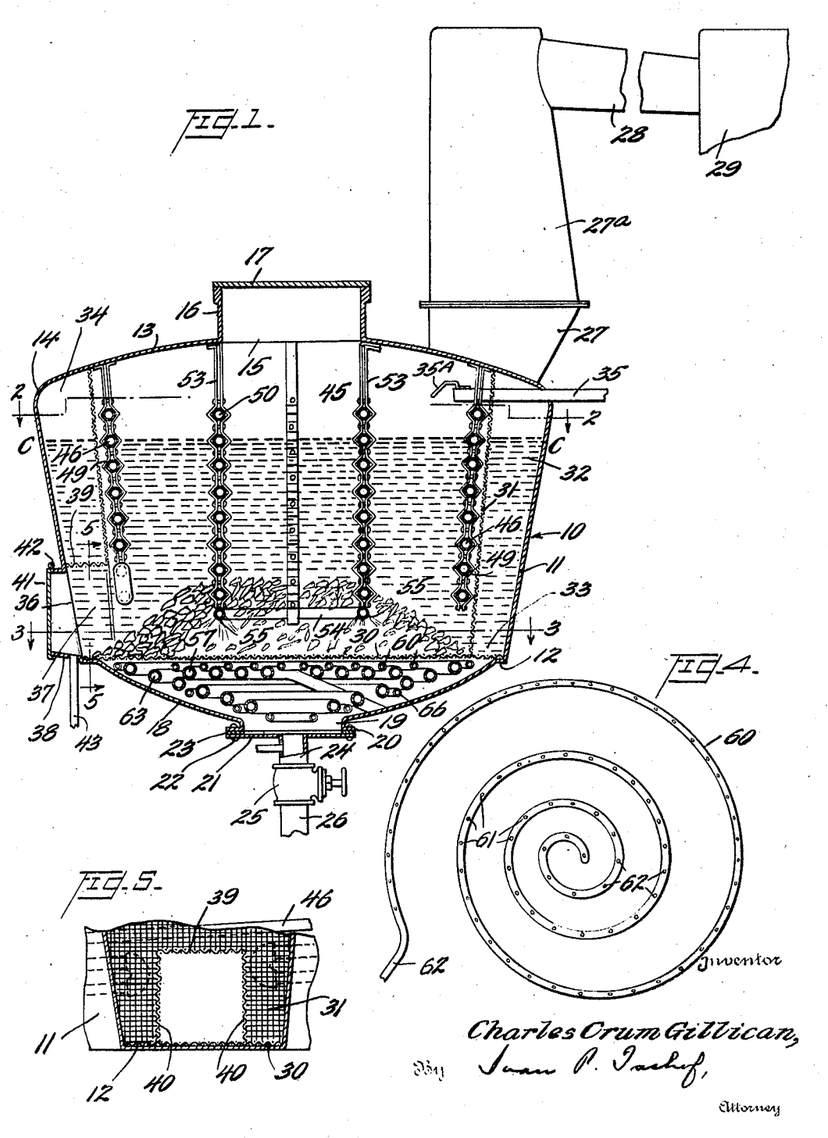
Figure 1 is a vertical diametric section through the still portion of the apparatus and showing certain other features in elevation.
Figure 4 is a bottom plan view of the upper sparger coil removed from the still.
Figure 5 is a fragmentary detail on the line 5—5 of Figure 1.
Figure 2:
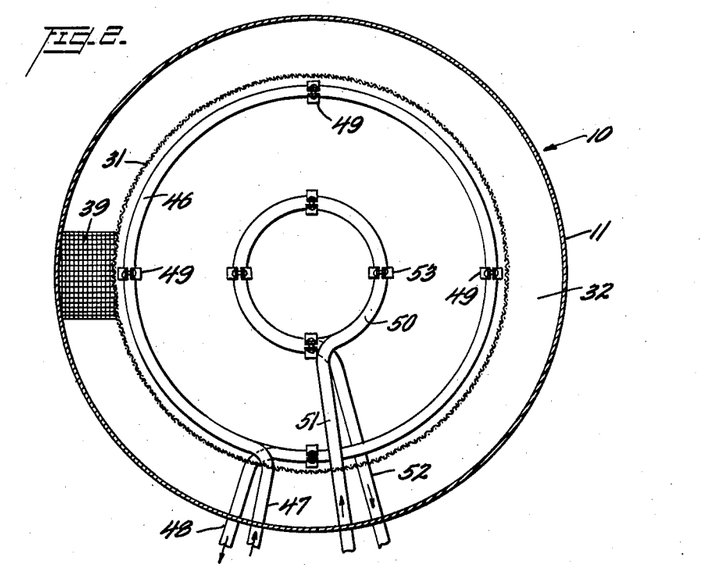
Figure 2 is a section on the line 2—2 of Figure 1, certain of the parts being omitted to avoid confusion.
Figure 3:
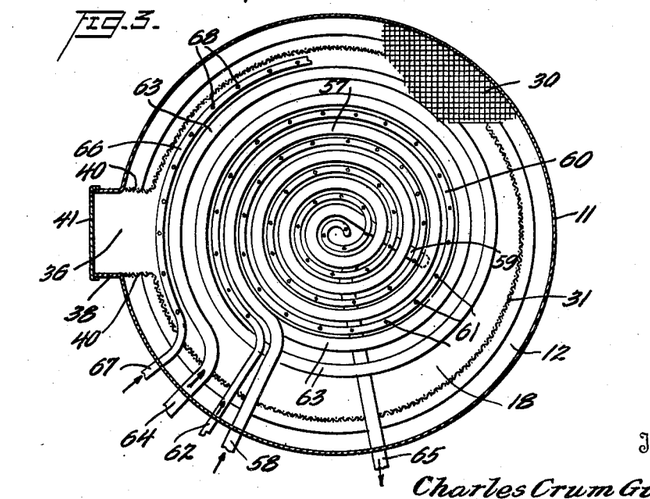
Figure 3 is a section on the line 3—3 of Figure 1, certain parts being broken away to show those beneath.

The apparatus as herein disclosed comprises a body or casing 10 of circular cross section. This body has an inverted frusto-conical side wall 11 provided at its lower edge with an inwardly extending flange 12. The top of the body 10 is formed by a segmento-spherical sheet 13 connected at its periphery to the top of the wall 11 by an annular curved portion 14. The top 13 has a central opening 15 surrounded by an upstanding wall 16 provided with a cover 17 which may be opened or removed to admit the crude oleoresin to be treated. Thus the opening 15 forms a charging opening which may be closed and opened at will. The bottom of the body 10 is formed partly by the flange 12 and partly by a segmento-spherical sheet 18 united at its periphery with the inner edge of the flange 12. This bottom is provided centrally with a short tubular neck 19 having an outwardly extending flange 20. A plate 21 extends across the neck and is secured to the flange 20 by suitable fastening means such as the rivets 22, a gasket 23 being interposed between the plate and flange to render the joint liquid tight. The plate 21 has a central opening from which extends a pipe nipple 24. On the lower end of the nipple 24 is secured a stop valve 25 and from this valve a pipe 26 leads to any suitable receptacle (not shown) for receiving the oleoresin after treatment. A breeching 27 leads upwardly from the top of the body and, by means of a pipe 28 communicates with a condenser 29 so that any part of the volatile content of the oleoresin and other volatile matter, such as turpentine and water introduced during the process, may be drawn off and condensed.

A woven wire or other suitable screen 30 extends across the lower part of the body 10 and is supported at its periphery on the annular flange 12 and braced intermediately of its end supports. An inverted frusto-conical screen wall 31 extends from the top 13 downwardly and rests at its lower edge on the screen 30. The wall 31, while connected with the wall 11 has its major diameter less than the major diameter of the wall 11 so that between the walls 31 and 11 there is formed an annular chamber 32 the cross section of which is greater at its upper end 34 than at its lower end 33.

The side wall 11 is provided with an opening 36 whereby chips which have been processed may be removed from the melter 10. From this opening there projects inwardly a wire screen tunnel 37 having an upper wire screen 39 and side walls 40 as shown in detail in Figure 5, said screen tunnel being preferably about 15 inches high and 26 inches wide. Obviously, the size of the tunnel can be changed according to circumstances. The bottom portion of the tunnel is formed by a portion of the screen 30, said screen being preferably made of woven wire stainless steel. A door 41 has its upper edge hinged as at 42 to the annular neck 38. Intermediate the door and the extension member there is a packing whereby the door, when in place is liquid and vapor tight.

The melter 10 is provided at any suitable place with a conduit serving to introduce a solvent into the melter, as for example the conduit 35. It is noted that the conduit 35 passes through the screen 31. Located at the inner extremity of the conduit is a baffle 35—A. A solvent, such as turpentine, upon coming in contact with the baffle 35—A is immediately broken up into small droplets and is dispersed over the entire mass of chips. The baffling serves to increase the area of the solvent contact surface thereby facilitating the action of the solvent on the oleoresin content of the chips. The so dispersed solvent medium trickles downwardly through the mass of chips.

A steam pipe 43 allows a live jet of steam to act on the chips which may accumulate adjacent the door 41 and in the screen tunnel, said steam jet also functioning to melt any solidified oleoresin which may be intermingled with the chips. The steam jet also functions to assist in cleaning the chips during any of the steps of the herein disclosed method and particularly during the step of extracting the solvent from the chips.

Extending around the chamber 45 formed with the wall 31 is a helical coil 46 of imperforate pipe. This coil lies close to and preferably in contact with the inner face of the wall 31 and for convenience is termed the upper and outer heating coil. The coil 46 is supplied at its top with steam from any suitable source (not shown) by means of an inlet pipe 47 and exhaust steam flows off from the lower end of the coil through an exhaust pipe 48. Suitable hangers 49 support this coil from the top 13. The chamber 45 also contains an imperforate heating coil 50 of helical form and of a diameter substantially that of the charging opening 15. The coil 50 is provided with steam through an inlet pipe 51 communicating with the upper end of the coil and exhaust steam passes off from the lower end of the coil 50 through an exhaust pipe 52. Hangers 53 support the coil 50 from the top 13. The coils 46 and 50 terminate at their lower ends in spaced relation to the screen floor 30, the former being arranged so that its coils at and adjacent the screen tunnel 37 do not obstruct said tunnel as clearly shown in Figure 5. There is provided a sparger coil 54 having jet apertures 55 facing downwardly, inwardly and outwardly. This coil 54 is supported by the lower ends of the hangers 49 and 53 just below the lower end of the coil 50. The arrangement of the coils 46 and 50 is such as to provide access for a rake or similar instrument to remove from the screen 30 and through the tunnel 37, the exhausted chips.

Just below the screen floor 30 there is an imperforate spiral steam coil 57 having a steam inlet 58 and a steam outlet 59. A spiral sparger coil 60 is also arranged just below the screen floor 30, the convolutions of the coil 60 being in staggered relation to the convolutions of the coil 57. Jet openings 61 permit emission of steam in an upward direction from the coil 60 and a steam pipe 62 provides steam for this coil. The coil 60 is also provided in its bottom wall with occasional openings. If these openings were not present there would be some tendency for the melted oleoresin to accumulate in the coil and solidify upon cooling. The bottom openings allow the oleoresin to escape downwardly, while the oleoresin is still in a liquid state. A second imperforate spiral steam coil 63 is arranged below the coil 57 and the convolutions of this coil are successively shaped downwardly so that the coil has a generally inverted frusto-conical form. An inlet pipe 64 supplies steam to the coil 63 and an outlet pipe 65 serves to permit the escape of steam from said coil. A sparger coil 66 is arranged with its convolutions in staggered relation to the convolutions of the coil 63 and is of the same general form as the coil 63. An inlet pipe 67 supplies steam to the coil 66 and jet openings 68 afford means for directing steam jets upwardly from the coil 66. It is to be observed that the outer convolution of the coil 57 extends around the device below the lower edge of the screen wall 31. The sparger coil 66 is also provided with several openings in its bottom wall, said openings functioning similarly to the openings in the bottom of the coil 60.

It is obvious that the various steam and exhaust pipes are valve controlled but it is not deemed necessary to show the valves in the drawings. Also the steam exhaust pipes are preferably connected to suitable traps (not shown) for the purpose of conserving heat.

In carrying out the present invention, the crude oleoresin is introduced through the charging opening 15 and the door 17 is closed. It may be stated that a normal charge is about 4,000 pounds of crude oleoresin, this occupying about three-quarters of the melter, the upper line of the charge being indicated by the line C—C. The characteristics of the charge may vary. Sometimes the charge of the crude oleoresin is entirely solid; sometimes the charge is a mixture of solid and liquid material and frequently the entire charge is liquid.

It is desired to emphasize at this point that the charge is capable of being treated by the present invention irrespective of whether the charge is wholly solid, wholly liquid or is a mixture of solid and liquid components. If a substantially solid charge of oleoresin is introduced into the cleaner and melter, then it is desirable, although not absolutely necessary, to convert this charge to a more liquid condition and this is accomplished by introducing into the melter and cleaner a solvent for the oleoresin, said solvent being preferably turpentine, the solvent functioning in a relatively hot condition due to the fact that it is heated by the steam present in the steam coils. As stated, between four and five thousand pounds of oleoresin is introduced into the melter and cleaner 10 and while the melter is being charged, steam is allowed to flow into the steam coils 46, 50, 57 and 63.

During the period of charge, the sparger coils do not operate. After charging is completed the door 17 is closed. Thereafter, the bottom sparger coils 60 and 66 are brought into operation and live steam issues from the jets thereof, said steam in turn agitating the charge and liquefying the liquefiable solid components of the charge. The steam also functions to cause the liquefied component of the charge to melt the solid oleoresin and so bring the solid oleoresin into a liquid state. Usually the time of the melting operation varies between 10 and 45 minutes, depending upon the character of the oleoresin being treated, that is, whether the charge is in a liquid condition, semi-liquid condition or is mostly solid. The amount of foreign matter present in the charge also has some influence on the melting period.

During the melting operation, the temperature of the charge is gradually raised and some of the turpentine will be distilled off through the breeching 27 and pipe 27—A.

It is desired to point out that the temperature during the melting operation should preferably attain a maximum of 250° F., so that not all of the turpentine will be distilled off from the oleoresin, it being high desirable that the oleoresin component be taken off from the melter 10 at a temperature sufficient to allow it to remain in the liquid stage or a flowable stage for a substantial period so that it can be conveyed to the receiving tanks and from the latter to the distillation apparatus. The temperature of the charge is, of course, gradually brought up to approximately 250° F.

During the melting operation the valve 25 of the discharge pipe 26 has been closed. When the melting operation is ended the valve 25 is opened and the liquid oleoresin passes through screen 30 and discharge pipe 26, to tanks T and/or T', or directly into the still S, there being left on the screen floor 30 a mass of chips and other extraneous solid matter. These chips contain as a coating or impregnation, oleoresin which according to the present invention is recovered as is hereinafter pointed out in detail.

After discharge of the liquid oleoresin, the valve 25 is closed and a solvent medium, preferably turpentine, for the treatment of the chips is introduced through the pipe 35. Simultaneously with the introduction of the turpentine the bottom sparger coils 60 and 66 are turned on and the steam assists in bringing the solvent, such as turpentine, into contact with the chips to more effectively dissolve the oleoresin present as a coating or impregnation.

During the time that the oleoresin is being discharged from the melter 10 the steam is allowed to flow through the coils 46, 50, 57 and 63. However, it is desired to point out that during this discharge period the steam may be turned off and the steam coils remain inactive.

The steam further acts to vaporize at least in part, some of the solvent medium and so the latter acts in its gaseous phase to more effectively treat the chips and enable the efficient recovery of the oleoresin therefrom. It is within the province of the present invention to totally vaporize the solvent and conduct the extraction in the vapor phase or to conduct the extraction of the oleoresin from the chips in the liquid phase or to have the solvent medium present in the vapor phase and the liquid phase.

It is believed broadly new to disperse a solvent medium in a melter and have the dispersed solvent either in the liquid or partly liquid and gaseous form contact the chips for the purpose of extracting the oleoresin from the chips. In one form of the invention the medium used to effect the dispersion of the turpentine is steam and, in the preferred form of the invention, super-heated steam under suitable pressure is used, as for example, 100 to 125 pounds per square inch. Although steam is the preferred medium, it is recognized that other mediums may be used.

While it has hitherto been proposed to treat crude oleoresin in a melter, pass the liquid resin through a filtering medium and then into a still where the turpentine is vaporized for the purpose of contacting the chips, which have been separated from the crude oleoresin, it is new to place sparger coils, as for example, coils 60 and 66, within the liquid solvent medium, said coils being located preferably below the chips to be treated and pass steam through the sparger coils, preferably under pressure, said steam blowing both liquid and/or gaseous solvent medium up through the chips to effectively wash and extract the oleoresin from the chips, said action occurring during the melting step and/or during the step of extracting oleoresin from the chips after the liquefied melted oleoresin has been removed from the melter.

Usually the solvent medium, such as turpentine, has a level slightly above the sparger coil 60 which is located very closely adjacent the filtering screen 30. It is highly desirable that the steam passing out of the steam jets 61, as shown in Figure 4, should contact with the solvent such as turpentine so that the steam preferably under pressure, together with the solvent may be shot up into the pile of chips on the screen and in this way effect the best extraction action.

Utilizing the above method, it is only necessary to have the solvent medium occupy a level slightly above the sparger coil 60 and in this manner, the extraction is carried out in the preferred form of the invention with a minimum amount of extraction medium. However, in some cases, the extraction medium may have a higher level and this is especially true when the chip pile extends well up towards the upper part of the melter 10 as may well be the case when the chips are allowed to accumulate from successive runs, this being one method of carrying out the present invention. In some cases, the solvent level may be substantially below the level of the sparger coil 60.

It is desired to point out that while the amount of solvent medium used for the extraction of oleoresin from the chips may greatly vary and still come within the spirit of the present invention, that when about 200 pounds of chips have accumulated on the screen 30, about 15 gallons of turpentine is used for the extraction step.

It is to be noted that the apparatus for carrying out the present invention and the method herein set forth utilizes two sparger coils 60 and 66 and preferably an additional sparger coil 54. In carrying out the extraction step, steam may pass through both coils, preferably under pressure and be allowed to escape through the openings in each of the sparger coils in order to effectively cause the turpentine or other solvent to function to extract the oleoresin from the chips. However, if there is only a small amount of chips and the liquid level falls below the level of the sparger coil 60, the extraction may be carried out utilizing only the lower sparger coil 66. The above illustrates the adaptability of the present apparatus to conditions that may be encountered in actual practice. The time that the solvent medium is in contact with the chips containing the oleoresin will vary according to the character of the solvent and the amount of and character of the chips or debris being treated. As an illustrative example, it may be stated that if 200 pounds of chips is on the screen that the latter may be treated with the solvent medium for a period of about ten minutes.

At the end of the treatment period with the solvent, the valve 25 is opened and the solution carrying the extracted oleoresin passes through the carry-off pipe 26 to the tanks T or T', or directly to the still S. The solution of oleoresin resulting from the extraction step with the solvent medium may be combined with the oleoresin when the solvent medium is turpentine or the extraction product of oleoresin and solvent may be distilled separately to recover the oleoresin therefrom. Of course, if gasoline or solvent naphtha is used as the extraction medium, then the extracted solution is distilled separately and is not combined with the oleoresin produced in the first part of the process. It is recognized that if the oleoresin present in the chips is extracted with a solvent other than turpentine, as for example, gasoline, the solution of the oleoresin in the gasoline may be combined with the oleoresin recovered in the first part of the process and then the resulting extraction product fractionally distilled to separately recover turpentine and gasoline leaving in the treatment apparatus a rosin product.

After extraction of the oleoresin from the chips by means of a solvent and the recovery of the oleoresin solution, the valve 25 is closed and the oleoresin-exhausted chips are treated with a medium functioning to remove the extraction solvent from the chips. Preferably this medium is steam, the latter issuing from the upper openings in the sparger coils 60 and 66. Simultaneously therewith, steam is preferably passing through coils 46, 50, 57 and 63.

It is to be noted that a sparger coil 54 is preferably located immediately beneath the heating coil 50, said sparger coil being provided with openings 55 which shoot steam under pressure downwardly, inwardly, and outwardly, into the body of the mass of chips lying on the screen 30. It is to be noted that the sparger coil 54 consists of one single turn of pipe, leaving the central conduit defined by the heating coil 50 open at the bottom so that the chips may pass freely through the melter.

It is desired to point out that the mass of chips lying on the screen usually extends considerably above the level of the sparger coil 54 and in some cases the height of the mass of chips may extend upwardly approximately one-half to two-thirds of the height of the melter, the contour line of the chips being highest in the center of the melter and tapering off towards the side of the melter.

Due to the fact that the surface of the chips is usually in the form of a conical surface or approximating the same, the pressure exerted on the chips is greatest immediately below the center of the conduit formed by the coil 50 and least adjacent the lower side walls of the melter and therefore, there is a tendency for the steam issuing from the openings in the sparger coils 60 and 66 to tunnel its way through the outer edge portions of the mass of chips lying on the screen.

After a very considerable amount of research, it was discovered that a more equal distribution of the steam upon the mass of the chips could be obtained by providing the sparger coil 54, said coil having openings 55 which project a stream of super-heated steam under pressure outwardly, downwardly, and preferably inwardly, into the extremities of the chip mass and effect a more even distribution of the steam during the steam step to recover solvent from the chips.

Stated differently, if the sparger coil 54 is not provided there is a substantial portion of the chips from which the solvent is not recovered. However, employing the sparger 54, there is a substantial greater recovery during the step of steaming solvent from the chip. It is recognized that if the chips were steamed for a relatively long period of time, that a fair recovery of the solvent from the chips could be effected without utilizing the sparger 54, and in the broad aspect of the present invention, it is not desired to be limited to the provision of a sparger coil 54. However, in the preferred form of the invention, it is highly desirable to employ the sparger 54 since this greatly speeds up the time of the steaming step. When treating about 200 pounds of chips, the steaming action is effected for approximately 10 minutes. Of course, here again, the time of steaming will vary with the amount and character of the chips being treated and the character of the solvent which it is desired to recover.

It is desired to point out that instead of introducing the solvent, as for example turpentine, and the medium for dispersing the solvent, which is preferably steam, separately, that the two may be introduced into the melter simultaneously. For example, turpentine under pressure may be introduced into the sparger coils 54, 60, 66, together with steam, and the mixture of the solvent, as for example, turpentine, and steam allowed to issue from the jet openings of the respective spargers. This form of the invention is a very effective method for bringing the extraction medium into contact with the chips to be treated or extracted. The steam is preferably under a pressure of 100 to 120 lbs., but obviously any suitable pressure may be used. The steam functions to divide the turpentine into little droplets or, if a suitable device is provided, the solvent may be atomized, thereby greatly increasing the contact surface available for contact with the chips.

Instead of introducing the turpentine through a conduit 35 located at the upper portion of the melter, the turpentine conduit may be located at other suitable places, as for example one or more conduits may be provided adjacent the bottom wall 18 of the melter. If the turpentine conduits project interiorly of the bottom wall 18 of the melter, then upon introduction of the turpentine through the conduits, the turpentine will contact with the steam or other dispersing medium issuing from the sparger coils 60 and 66. This will function to project the solvent medium upwardly from the bottom face of the pile of chips.

Figure 6:
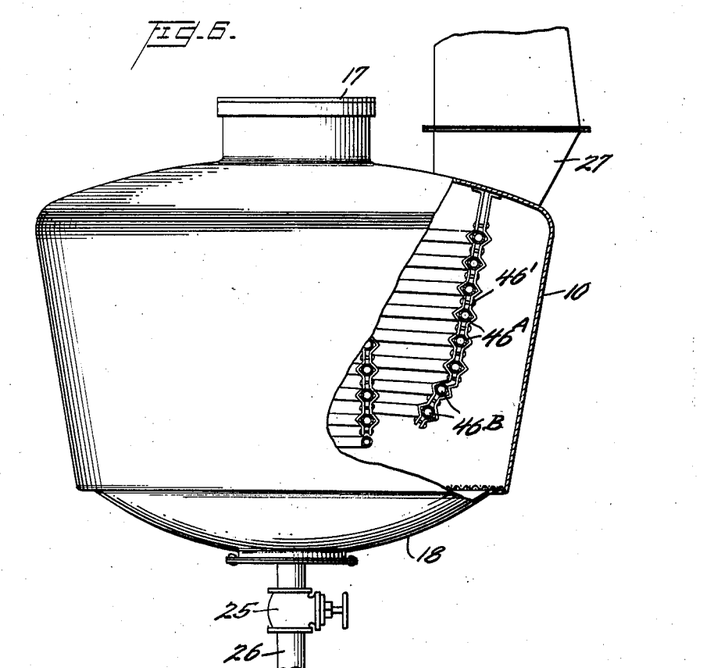
Figure 6 is an elevation partly in section of a modified form of melter.

It is desired to state that while it is preferred, in carrying out the present invention, to utilize a screen 31, that this screen may be dispensed with. The function of the screen 31 is to prevent chips from becoming caught in the annular space between the steam coil 46 and the wall 11 of the melter. Utilizing a coil 46 in the form shown in the drawings, there was a tendency for the chips to become wedged in the annular space between the steam coil 46 and the melter wall 11. If the screen is dispensed with the wedging may be eliminated by pulling the coil 46 inwardly at its bottom portion towards the central steam coil 50, so that the space at the bottom portion of the steam coil 46 and the wall 11 is wider than the space at the top portion between the steam coil 46 and the wall 11. This will tend to prevent the wedging of the chips in the space between the outer steam coil 46 and the wall 11. As shown in Figure 6 the coil 46' is provided with an upper portion 46—A and a bottom portion 46—B, the latter being turned inwardly at an angle to the upper portion 46—A, so that there is more space between the steam coil and the side wall 11 of the melter at the bottom than there is at the top of the melter.

The present invention has the following advantages:

First, a better grade rosin is produced. Prior to the present invention it was customary to distill oleoresin in a direct fired still and the temperature in a still of this type is high enough to char the debris that accumulates on the bottom of the still, said charred material causing the rosin to go off color and become degraded. Such degraded rosin brings a much cheaper price in the open market.

If the oleoresin is treated in accordance with the present invention the temperature in the melter is always insufficient to char the chips accumulating on the screen 30. In the prior art stills the charring is due to, in many cases, what is known as localized heating, that is, there are spots in the still that are at materially higher temperatures than other parts of the still. In accordance with the present invention all parts of the chip mass are substantially evenly heated. In other words, during the melting operation the heat necessary is substantially evenly distributed by virtue of the provision of heating coils and sparger coils as set forth. Further, it may be pointed out that the sparger coils initiate and maintain a more or less continuous agitation during the melting period, which evenly distributes the heat. It may be pointed out that when the charging is finished the melter is charged to the line C—C and agitation and circulation are of a decided advantage in treating such a large mass of material.

Figure 7:
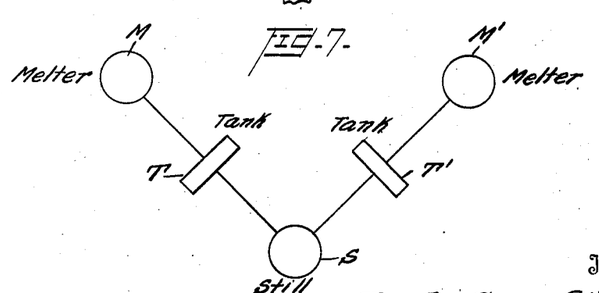
Figure 7 is a diagrammatic representation showing a battery of melters connected to a still.

It is desired to point out that in accordance with the present invention the time for recovering rosin and turpentine from the crude oleoresin is greatly reduced. This will appear from the following:

Referring to Figure 7 it is noted that in the preferred method of operation two melters M and M' are in operative connection with a still S preferably through the intermediary of storage tanks T and T', the latter being desirably provided with heater coils. In initiating operations the melters M and M' are charged with crude oleoresin and it takes about thirty minutes roughly for the charging and melting of the oleoresin in the melter M. The strained oleoresin from the melter M is then introduced directly into the still S. Usually the oleoresin is melted and recovered from the melter M somewhat before the oleoresin is recovered from the charge melted in melter M' and so the distillation of the strained oleoresin coming from the melter M is under way before oleoresin, coming from the melter M', is ready to be introduced into the still S. If the charge in melter M' has been substantially completely melted and ready to go into still S, it may be carried into storage tank T' to be held there until the processing of the charge, which has been supplied to the still S from the melter M, is completed.

It is desired to point out that the material coming from the melters may be distilled in the still S in about forty-five minutes to one hour, this being half of the time required to process oleoresin used in the old method where the crude oleoresin was introduced directly into the still without the pretreatment step. It is desired to point out that the reason that the time for the complete processing of the crude oleoresin is reduced is that in the melters M and M', which run simultaneously with the still S, a portion of the turpentine has been removed from the crude oleoresin. Further, the strained oleoresin coming from the melters M and M' has a fairly high temperature, especially when it is introduced directly from the melters into the still S and, therefore, it is not necessary to provide as many heat units for the charge in the still S as was customary when the crude oleoresin was introduced directly into the still to be processed.

It is, therefore, clear from the above that by the hook-up set forth embodying two melters in combination with a single still that the time of treatment of the crude oleoresin may be greatly reduced. Further, proceeding as set forth, economy of operation is effected and the resulting labor cost is greatly reduced.

Proceeding in accordance with the present invention, there is a substantially complete recovery of the rosin present in the crude oleoresin.

What is claimed is:

1. In an apparatus for purifying crude oleoresin containing chips or other solid debris, a treatment vessel having a charging opening at its top and a draw-off opening for liquid rosin at its bottom, a screen floor extending across said vessel intermediate said openings to prevent the passage of said debris through said draw-off opening, a sparger coil having upwardly directed jet openings positioned below said screen and a second sparger coil above said screen having a plurality of jet openings pointed downwardly and at an angle to the vertical to project jets of steam intersecting the jets of steam produced by said first mentioned sparger coil to thereby prevent formation of channels by said first mentioned sparger coil in a debris mass held on said screen.

2. In an apparatus for purifying crude oleoresin containing chips or other solid debris, a treatment vessel having a charging opening at its top and a draw-off opening for liquid rosin at its bottom, a screen floor extending across said vessel intermediate said openings to prevent the passage of said debris through said draw-off opening, a sparger coil having upwardly directed jets positioned below said screen and a second sparger coil above said screen having a plurality of jet openings pointed downwardly and at an angle to the vertical to project jets of steam intersecting the jets of steam produced by said first mentioned sparger coil to thereby prevent formation of channels by said first mentioned sparger coil in a debris mass held on said screen, a spiral heating coil of generally inverted frusto-conical form below said first mentioned sparger coil and a third sparger coil having upwardly directed jet openings and convolutions staggered with respect to said last mentioned spiral heating coil.

3. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the same to liquefy at least in part of the oleoresin content of the mass, thereafter treating the mass with steam jets to complete the liquefaction of the oleoresin and agitate the same while maintaining the oleoresin at a temperature which will inhibit all the turpentine content thereof from being volatilized and keep the oleoresin in a liquid form, separating the liquid containing oleoresin from the chips and other solid debris, adding a solvent medium for the oleoresin to the separated chips and debris, and agitating and heating the chips and solvent by steam jets below said chips and within the solvent so as to blow the solvent upwardly to thereby wash and extract adhering oleoresin from the chip mass.

4. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the same to liquefy the oleoresin content of the mass, thereafter treating the mass with steam jets to complete the liquefaction of the oleoresin and agitate the same while maintaining the oleoresin at a temperature which will inhibit all the turpentine content thereof from being volatilized and keep the oleoresin in a liquid form, separating the liquid containing oleoresin from the chips and other solid debris, adding a solvent medium for the oleoresin to the separated chips and other debris, agitating and heating the chips and solvent by steam jets below said chip mass and within the solvent so as to blow the solvent upwardly to thereby wash and extract adhering oleoresin from the chip mass separating the low-value solution of oleoresin from the chips and debris, subjecting the latter to the action of steam jets to extract the solvent from the chip mass, said jets tending to exert a tunneling action against the extremities of the chip mass, and simultaneously directing other steam jets on and into said mass to neutralize said tunneling action.

5. The method of treating a mass of crude oleoresin containing a minor proportion of turpentine and a minor proportion of chips and other solid debris preliminary to the final distillation of the oleoresin to be recovered therefrom, comprising charging said mass of oleoresin into a treatment vessel, heating the same to liquefy the oleoresin content of the mass, adding turpentine to said mass in quantities sufficient to assist in the liquefaction thereof, thereafter treating the mass with steam jets to complete the liquefaction of the oleoresin and agitate the same while maintaining the oleoresin at a temperature which will inhibit all the turpentine content thereof from being volatilized and keep the oleoresin in a liquid form, separating the liquid containing oleoresin from the chips and other solid debris, adding turpentine to the chips and other solid debris, agitating and heating the chips and turpentine by steam jets positioned below said chip mass and within the solvent so as to blow the turpentine upwardly to thereby wash and extract adhering oleoresin from the chip mass, separating said oleoresin extract from the chips, and recovering rosin therefrom.

6. In an apparatus for purifying crude oleoresin containing a turpentine component and solid debris including chips, a treatment vessel having a charging opening adjacent its top portion and a draw-off for liquid oleoresin adjacent its bottom, a screen floor extending across said vessel intermediate said openings to prevent the passage of said debris through said draw-off opening, heating members below said screen, heating means above the screen arranged to produce an obstructed passage between the charging opening and said screen, a sparger coil provided with downwardly and outwardly directed jet openings below said last mentioned heating means and spaced from said screen, and a second sparger coil having upwardly directed jet openings positioned below said screen, said sparger coil projecting a heating medium through said debris to effectively extract the oleoresin content of said chips.

7. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquefied oleoresin from the mass of chips and debris, repeatedly projecting a heated solvent through the chips to wash and extract the oleoresin adhering thereto and present in the interstices thereof while at the same time subjecting the chips to treatment with a gaseous heating medium, separating the extracted oleoresin solution from the chips, and recovering rosin from said solution.

8. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquid containing oleoresin from the resulting pile of chips and the other solid debris, adding a solvent medium for the oleoresin to the separated chips and debris, forming in said treatment vessel a reservoir of solvent medium, repeatedly projecting the heated solvent medium through the chips to wash and extract the oleoresin adhering thereto and present in the interstices of the chips while at the same time subjecting the chips to treatment with a gaseous heating medium, separating the extracted oleoresin solution from the chips, and recovering the rosin from said solution.

9. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquid containing oleoresin from the chips and the other solid debris, adding turpentine to the separated chips and debris, forming in said treatment vessel a heated reservoir of turpentine, repeatedly projecting turpentine through the chips to wash and extract the oleoresin adhering thereto and present in the interstices of the chips while subjecting the chips to treatment with a gaseous heating medium, separating the extracted oleoresin solution from the chips, and recovering rosin from said solution.

10. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquid containing oleoresin from the resulting pile of chips and the other solid debris, adding a solvent medium for the oleoresin to the separated chips and debris, forming in said treatment vessel a reservoir of heated solvent adjacent to at least one face of said pile, projecting a mixture of steam and solvent adjacent said pile face to agitate, heat and wash the chip mass and extract the oleoresin adhering to and present in the interstices of the chips, separating the extracted oleoresin solution from the chips, and recovering rosin from said solution.

11. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquefied oleoresin from the mass of chips and debris, repeatedly projecting a heated solvent through the chip mass to wash and extract the oleoresin adhering thereto and present in the interstices thereof while at the same time subjecting the chips to treatment with a gaseous heating medium, separating the extracted oleoresin solution from the chips, and steaming the so-treated chip mass to recover the solvent therefrom while preventing tunneling therein.

12. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquefied oleoresin from the mass of chips and debris, repeatedly circulating heated turpentine through the chips to wash and extract the oleoresin adhering thereto and present in the interstices thereof while at the same time subjecting the chips to treatment with a gaseous heating medium, separating the extracted oleoresin solution from the chips, and recovering rosin from said solution.

13. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, agitating the mass while maintaining the oleoresin at a temperature which will inhibit all of the turpentine content thereof from being volatilized and keep the oleoresin in liquid form, separating the liquefied oleoresin from the mass of chips and debris, repeatedly projecting heated turpentine through the chips to wash and extract the oleoresin adhering thereto and present in the interstices thereof while at the same time subjecting the chips to treatment with a gaseous heating medium, separating the extracted oleoresin solution from the chips, and recovering rosin from said solution.

14. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, agitating the mass with a relatively inert gas while maintaining the oleoresin at a temperature which will inhibit all of the turpentine content thereof from being volatilized and keep the oleoresin in liquid form, separating the liquefied oleoresin from the mass of chips and debris, repeatedly projecting a heated solvent through the chips to wash and extract the oleoresin adhering thereto and present in the interstices thereof while at the same time subjecting the chips to treatment with a gaseous heating medium, separating the extracted oleoresin solution from the chips, and recovering rosin from said solution.

15. The method of treating a mass of crude oleoresin containing turpentine and a minor proportion of chips and other solid debris preliminary to the final distillation of the oleoresin to be recovered therefrom, comprising charging said mass of oleoresin into a treatment vesel, heating the latter to liquefy at least in part the oleoresin content of the mass while inhibiting any substantial charring of the chips therein, agitating the mass with steam while maintaining the oleoresin at a temperature which will inhibit all of the turpentine content thereof from being volatilized and keep the oleoresin in liquid form, separating the liquefied oleoresin from the mass of chips and debris, repeatedly projecting a heated solvent through the chips to wash and extract the oleoresin adhering thereto and present in the interstices thereof while the same time subjecting the chips to treatment with a gaseous heating medium, separating the extracted oleoresin solution from the chips, and recovering rosin from said solution.

16. The method of treating a mass of crude oleoresin containing turpentine and a minor proportion of chips and other solid debris preliminary to the final distillation of the oleoresin to be recovered therefrom, comprising charging said mass of oleoresin into a treatment vessel, heating the latter to liquefy at least in part the oleoresin content of the mass while inhibiting any substantial charring of the chips therein, maintaining the oleoresin at a temperature which will inhibit all of the turpentine content thereof from being volatilized and keep the oleoresin in liquid form, separating the liquid containing oleoresin from the chips and the other solid debris, adding a solvent medium for the oleoresin to the separated chips and debris, forming in said treatment vessel a heated reservoir of solvent medium, circulating a mixture of solvent and steam through said chips to wash and extract the oleoresin adhering thereto and present in the interstices of the chips, separating the extracted oleoresin solution from the chips, and recovering rosin from said solution.

17. The method of treating a mass of crude oleoresin containing a minor proportion of chips and other solid debris comprising heating the crude mass at a temperature sufficiently low to inhibit distillation of solvent from the mass to liquefy the oleoresin-content thereof while subjecting the mass and solvent to non-oxidizing gaseous jet agitation to disperse and circulate the solvent and bring the latter in contact with the oleoresin, separating the liquefied oleoresin from the mass of chips and debris, adding a solvent medium for the oleoresin to the separated chips and debris, projecting a solvent medium through the chip mass to remove oleoresin adhering to and absorbed by said chip mass while at the same time subjecting the chip mass to treatment with a gaseous heating medium, separating the low-value solution of oleoresin from the chips and debris, subjecting the latter to the action of a primary upwardly directed medium adapted to heat said mass of chips and extract the solvent therefrom, said meduim tending to exert a tunneling action adjacent the extremities of the chip mass, and simultaneously subjecting said chip mass to the action of an outwardly and downwardly directed secondary medium adapted to heat the chips and exert a neutralizing effect against said tunneling action.

18. The method of treating a mass of crude oleoresin containing a minor proportion of chips and other solid debris comprising heating the crude mass at a temperature sufficiently low to inhibit distillation of solvent from the mass to liquefy the oleoresin-content thereof while subjecting the mass and solvent to non-oxidizing gaseous jet agitation to disperse and circulate the solvent and bring the latter in contact with the oleoresin, separating the liquefied oleoresin from the mass of chips and debris, adding a solvent medium for the oleoresin to the separated chips and debris, projecting a solvent medium through the chip mass to remove oleoresin adhering to and absorbed by said chip mass while at the same time subjecting the chip mass to treatment with a gaseous heating medium, separating the low-value solution of oleoresin from the chips and debris, subjecting the latter to the action of upwardly directed steam jets to heat said mass of chips and extract the solvent therefrom, said steam jets tending to exert a tunneling action against the extremities of the chip mass and simultaneously directing steam jets outwardly and downwardly on and into said chip mass to neutralize the tunneling effect of said upwardly directed steam jets.

CHARLES CRUM GILLICAN.